June 5, 1956  E. NEMEC  2,748,604
UNIVERSAL POWER SUPPLY
Filed Oct. 29, 1952  2 Sheets-Sheet 1

INVENTOR.
EMIL E. NEMEC
BY
*Marin Moody*
ATTORNEY

June 5, 1956  E. NEMEC  2,748,604
UNIVERSAL POWER SUPPLY
Filed Oct. 29, 1952  2 Sheets-Sheet 2
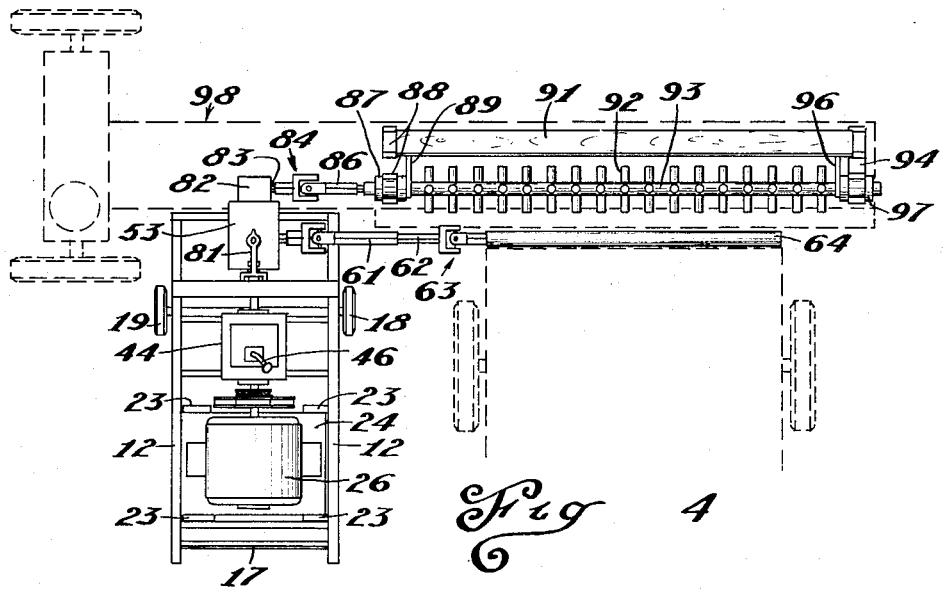
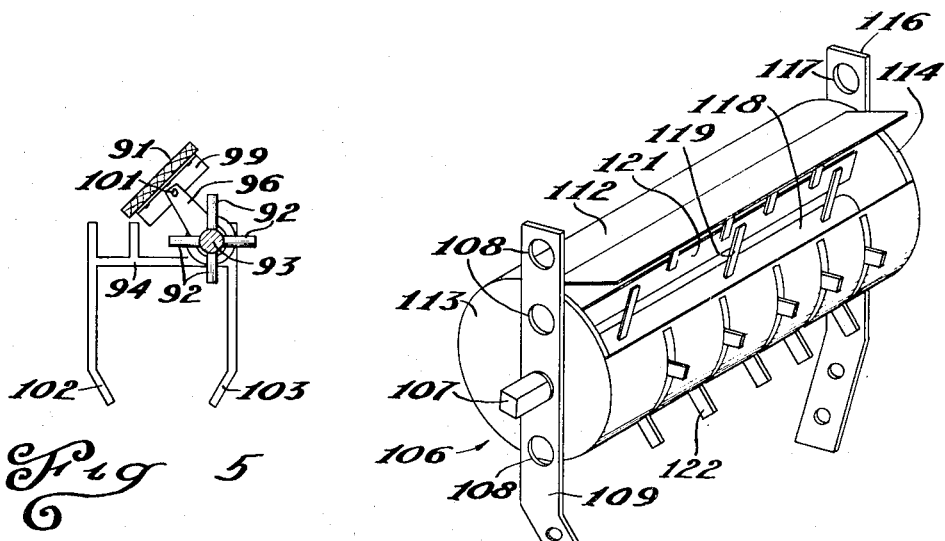
INVENTOR.
EMIL E. NEMEC
BY
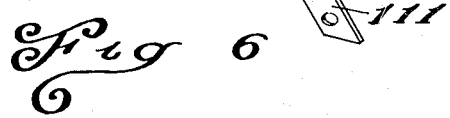
ATTORNEY

United States Patent Office 2,748,604
Patented June 5, 1956

2,748,604

UNIVERSAL POWER SUPPLY

Emil Nemec, Ely, Iowa

Application October 29, 1952, Serial No. 317,442

4 Claims. (Cl. 74—16)

This invention relates in general to driving means and in particular to a universal multiple output power supply.

As farm machinery has become more and more mechanized, it has been found economically feasible to separate the prime mover from the machines so that a single engine may be used to drive a number of machines. Generally, the driving means may be connected to only one machine at a time, and when a number of machines are used simultaneously, a number of driving means are required.

It is an object of this invention therefore to provide a multiple output power supply.

Another object of this invention is to provide a variable speed power supply which has a plurality of output shafts turning at different speeds.

Yet another object of this invention is to provide an improved variable speed universal power supply.

A feature of this invention is found in the provision for a portable frame member which supports a motor. The motor is connected to a transmission which has a variable gear ratio. The output of the transmission is connected to a plurality of shafts through various gears and clutches.

Further objects, features and advantages of the invention will become clear from the following description and claims when read in view of the drawings, in which:

Figure 4 is a top view of the invention;

Figure 5 is a detail end view of the apparatus of Figure 4;

Figure 6 is an isometric view of an attachment which may be used with this invention.

Figure 1:
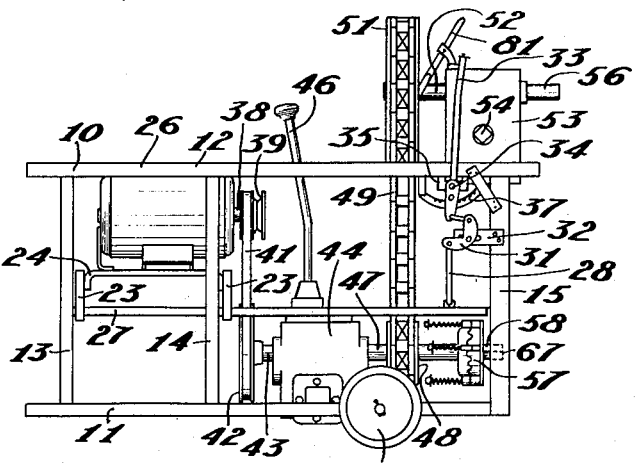
Figure 1 is a side view of the power supply of this invention.
Figure 2:
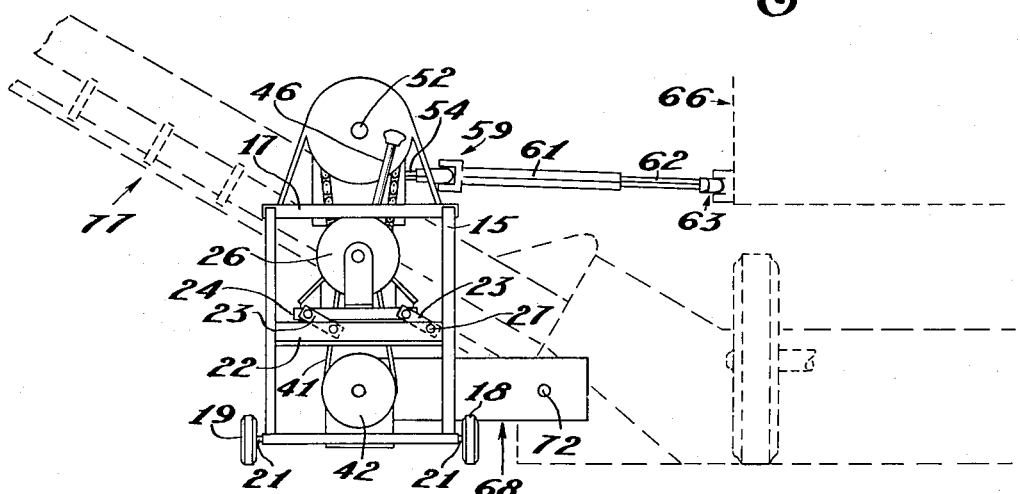
Figure 2 is an end view.

Figure 1 illustrates a frame member designated generally as 10 which has lower longitudinal members 11 and upper longitudinal members 12. Vertical members 13, 14 and 15 extend between members 10 and 12. As best shown in Figure 2 horizontal frame members 16 and 17 connect the vertical members.

Ground wheels 18 and 19 are mounted on an axle 21 supported by the rfame so that the apparatus may be moved.

Mounted between the vertical members 13 and 14 are a pair of horizontal angle irons 22 which pivotally support short links 23. A supporting plate 24 is pivotally connected to the upper end of links 23 and a driving means, as for example an electric motor 26 is supported thereon. A longitudinal shaft 27 passes through the pivot points of the pair of links 23. The shaft 27 has an extension 28 attached to it which is in turn connected to an L-shaped member 31 that is pivotally supported by a bracket 32.

A lever 33 is pivotally supported by a pin 34 attached to a bracket 35 connected to the member 12. A crescent-shaped member 37 is supported by the frame adjacent the lever and is engaged by a detent member of the lever 33 in a well known manner.

Movement of the lever 33 rotates the shaft 27 which lowers and raises the position of the driving means 26.

The driving means 26 has an output shaft 28 which carries a pulley 39. A belt 41 rides on the pulley 39 and passes over a second pulley 42 which is in turn mounted on a drive shaft 43 that furnishes an input to a transmission 44 which might be for example a truck transmission.

A gear shift lever 46 extends from the transmission 44 and controls the gear ratio between the input shaft 43 and the output shaft 47 of the transmission.

A sprocket wheel 48 is mounted on the shaft 47 and a chain 49 passes over it and over a second sprocket wheel 51 which is mounted on a shaft 52 supported in a gear reduction box 53 mounted on the top of the frame member 12.

The gear reduction 53 has a pair of output shafts 54 and 56. Shaft 54 extends transversely therefrom and shaft 56 extends parallel to shaft 52.

Attached to the shaft 47 is a torque limiting clutch 57 which has an output shaft 58.

As best shown in Figure 2 the output shaft 54 may be connected to a universal 59 which has a square output shaft 61 that is hollow and slidably received therein a smaller solid shaft 62. A second universal joint 63 is connected to shaft 62 and is detachably connected to the driving shaft 64 of the false end gate of a wagon 66. This is seen in Figures 2 and 4.

A false end gate allows a load to be removed from a wagon by pulling a member longitudinally of the wagon to unload it. Such devices are well known to those skilled in the art and will not be described in detail herein.

Figure 3:
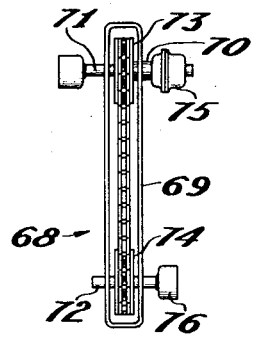
Figure 3 is an enlarged detail view of an offset power transmitting mechanism.

The shaft 58 which extends from the clutch 57 has a squared end portion 67. An offset drive unit, designated generally as 68 is shown in Figure 3.

Figure 7:
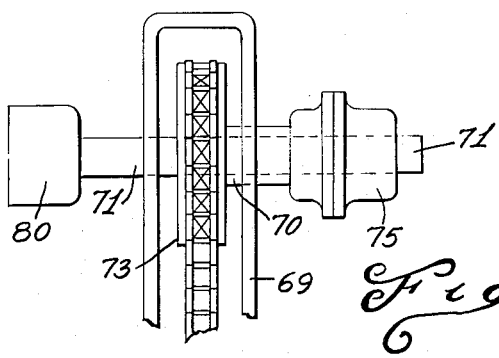
Figure 7 is a detail view of a portion of the offset power transmitting mechanism.

The unit 68 comprises a hollow rectangular frame member 69 which rotatably supports shafts 70, 71 and 72. A pair of gears 73 and 74 are mounted on the shafts 70 and 72 between the frame member. As shown in Figure 7, the shaft 70 is hollow and shaft 71 extends therethrough. A one-way clutch 75 connects the ends of shafts 70 and 71 to allow shaft 71 to drive shaft 70 in one direction. A coupling member 80 is attached to the other end of shaft 71 and is receivable over the shaft 58. Thus, the shaft 71 is driven by the shaft 58.

The shaft 72 also has a connecting member 76 which is receivable over the drive shaft of a machine, as for example the elevator 77 shown in Figure 2.

In operation the apparatus shown in Figure 2 may be used to operate a conventional elevator designated generally as 77 while simultaneously unloading a wagon by actuation of the false end gate of the wagon.

The wagon 66 is placed transversely of the hopper 78 of the elevator so that the end of the wagon is above the hopper. The universal joint 63 is connected to the drive shaft of the false end gate which is mounted on the rear of the wagon. The universals 59 and 63 and the slide relationship between shafts 61 and 62 allow variation of the wagon position.

The drive shaft of the elevator extends parallel to the longitudinal axis of the wagon and relatively close to the wheels of the wagon. For this reason the offset member shown in Figure 3 is coupled to the elevator.

The motor 26 may then be started and the lever 33 moved so as to tighten the belt 41 so that the motor furnishes an input to the transmission 44. If the transmission 44 is in gear the shaft 47 will immediately start to turn thus driving the elevator and the shaft 52 through the belt arrangement. The transmission 44 may be shifted with the lever 46 to obtain different gear ratios or reverse. No clutch is needed in the transmission because shifting can be done without it or if necessary the motor 26 may be stopped and the gears shifted.

A clutch is mounted in the gear box 53 and allows the shafts 54 and 56 to be disengaged from the driving power. A clutch lever 81 controls the clutch. The gear reduction 53 reduces the relatively high speed of the shaft 52 to one R. P. M., for example. The one-way clutch on shaft 70 prevents the elevator from being turned backwards.

The speed of the shaft 58 is approximately 120 R. P. M. which is the speed required to run a conventional elevator. Since oftentimes in raising corn or produce an elevator becomes clogged a limiting torque will be applied to the shaft 58 by clutch 57 which will not be great enough to break the elevator drive.

It is to be noted that if the wagon is being unloaded too rapidly for the elevator, the clutch 81 may be disengaged to stop the false end gate shaft 54 until the elevator has caught up.

Figure 4 illustrates a modification of the invention wherein a second gear box 82 is attached to the gear box 53 and has an output shaft 83 that extends transversely of the shaft 56. A universal 84 couples shaft 83 to shaft 86. Shaft 86 drives a regulator wheel comprising a longitudinal shaft 93 with a number of fingers 92 extending therefrom. The shaft 93 is rotatably supported by bearings 87 and 97 supported on a hopper by suitable frame members 94 shown in detail in Figure 5. The fingers 92 and shaft 93 form a paddle wheel. A guide member 91 is supported above the paddle wheel by the frame members 96 and 99 and bolt 101.

The hopper may be attached to a blower designated generally as 98 and hay may be unloaded from the wagon 66.

In operation, the device shown in Figures 4 and 5 may be used to unload a wagon containing hay.

The false end gate of the wagon is driven by the shaft 61 and the paddle wheel is driven by shaft 86 to help control unloading of the hay.

Figure 6 illustrates another attachment which may be mounted on the hopper of blower 98 at right angles to the paddle wheel. The attachment 106 includes a shaft with a square end which is rotatably supported in holes 108 and 117 formed in end supports 109 and 116.

The lower ends 111 of members 109 and 116 are fastened to the blower.

A protective cover 112 partially surrounds shaft 107 and has end portions 113 and 114. The portion 118 of shaft 107 between ends 113 and 114 has radial members 119 extending therefrom. Longitudinal paddles 121 are connected to members 119 and teeth 122 extend from the paddles 121.

The cover 112 has a variable radius and has slots through which teeth 122 extend over a portion of their travel.

In operation, the shaft 107 is coupled to the output shaft 83 and the paddles 121 force air through the hay to remove dirt and dust.

It is seen that this invention provides a power supply which has a number of output shafts. This allows the power supply to be used in a plurality of ways with a number of different machines while only one motor or driving means is needed.

Although this invention has been described with respect to preferred embodiments it is not to be so limited as changes and modifications may be made therein which are within the full intended scope of the invention as defined by the appended claims.

I claim:
1. A universal power supply comprising a frame member, a driving means mounted on said frame member and adjustable relative thereto, an output shaft connected to said driving means, a pulley mounted on said output shaft, a transmission mounted on said frame member, an input shaft connected to said transmission, a second pulley attached to the input shaft of said transmission, a flexible belt passing over the first and second pulleys, an output shaft extending from said transmission, a torque limiting clutch attached to the output shaft of said transmission, a first sprocket mounted on the output shaft of the transmission, a gear box mounted on said frame member, an input shaft mounted in said gear box, a second sprocket mounted on the input shaft of said gear box, a chain connecting the first and second sprockets, a pair of output shafts extending from said gear box and means for moving said driving means relative to said frame member.

2. In apparatus according to claim 1 a protective housing attached to said frame member and substantially covering said second sprocket.

3. In apparatus according to claim 1 a transverse axle attached to said frame member, and a pair of ground wheels mounted on said axle adjacent opposite ends.

4. An offset power transmitting mechanism comprising a hollow frame member, a first shaft rotatably supported in said hollow frame member adjacent one end thereof, a first connecting means connected to one end of said first shaft, a hollow shaft rotatably supported in said frame member, a second shaft received within said hollow shaft, a one-way clutch attached to the free ends of said hollow shaft and said second shaft, a first sprocket mounted on said first shaft, a second sprocket mounted on said hollow shaft, and a flexible drive belt passing over said first and second sprockets.

References Cited in the file of this patent
UNITED STATES PATENTS

| | | |
|---|---|---|
| 1,612,043 | Nonneman | Dec. 28, 1926 |
| 2,614,433 | Cuckler | Oct. 21, 1952 |